Jan. 10, 1967  A. C. COFFMAN  3,297,254
RAIN-CONTROLLED LAWN SPRINKLER
Filed Aug. 6, 1964  2 Sheets-Sheet 1

INVENTOR.
ALFRED C. COFFMAN
BY
ATTORNEY

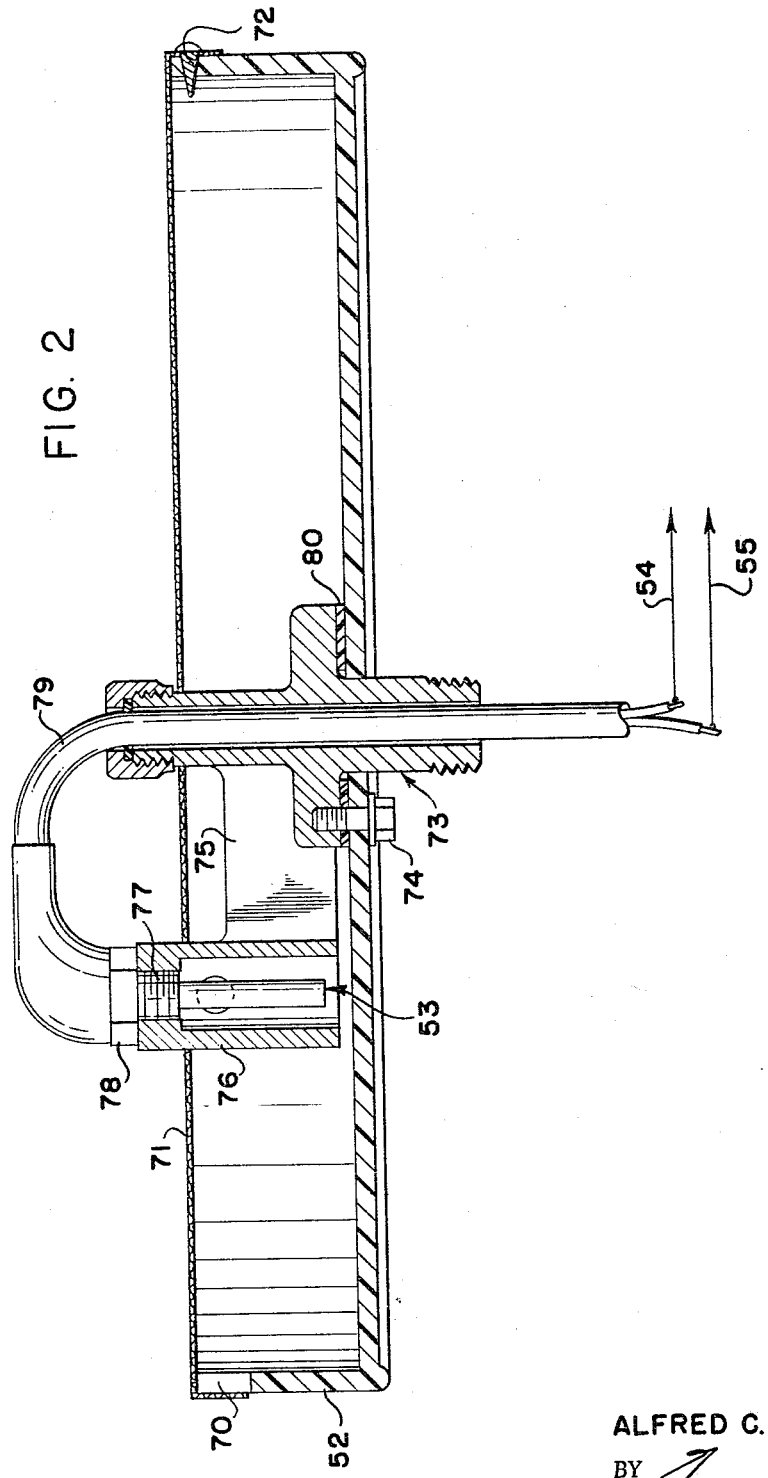

United States Patent Office 3,297,254
Patented Jan. 10, 1967

3,297,254
RAIN-CONTROLLED LAWN SPRINKLER
Alfred C. Coffman, 1236 Sunset View Drive W.,
Akron, Ohio 44313
Filed Aug. 6, 1964, Ser. No. 387,825
5 Claims. (Cl. 239—63)

This invention relates to lawn-sprinkler systems and more particularly to a control system to be used therewith. It is designed particularly for use in locations where water is expensive, as in Florida.

It is well known that proper lawn care, where the soil is sandy, requires frequent sprinkling. Where water for sprinkling is expensive, excessive sprinkling is to be avoided. On the other hand infrequent sprinkling will result in damage to the lawn.

Heretofore it has been the practice to employ lawn-sprinkling systems to insure periodic sprinkling for predetermined intervals. A chief drawback with present commercially available lawn-sprinkler systems has been their inability to automatically sense the occurrence of a recent rain and to thereby achieve a shutdown of an automatic sprinkling system. This desirable shutdown of the sprinkling system after a rain has been achieved to a certain extent by manual control of the system by the homeowner, but in the event that the homeowner is away at the time of the rain, much water may be wasted. On the other hand a device which is sensitive to even a slight rainfall to cut off the sprinkling system is also undesirable since the rainfall may not have been sufficient to supply the normal requirements of the lawn. It is therefore a primary objective of my invention to overcome these and other inefficiencies and undesirable features of prior-art sprinkling systems.

It is an object of my invention to provide a control system for use with an automatic sprinkling system which is sensitive to predetermined amounts of rainfall to prevent the operation of the sprinkler system when not necessary.

It is another object of my invention to provide a control system for an automatic sprinkling system which not only is sensitive to a predetermined amount of rainfall to prevent operation of the sprinkler system, but which is also automatically operative thereafter to permit normal operation of the sprinkling system.

It is another object of my invention to provide an adjustable control system which is responsive to a variable pre-established standard quantity of rainfall to disable operation of the sprinkler system for a predetermined length of time whereupon the lawn will be in need of further watering.

It is yet another object of this invention to provide a control system for a lawn-sprinkling system which is of sturdy construction, reliable, and economical to manufacture.

It is still another object of this invention to provide a control system for automatically controlling the operation of a lawn-sprinkling system in response to predetermined quantities of rainfall which is compatible with any of the many commercially available lawn-sprinkling systems and which is easy to incorporate therewith.

It is a further object of my invention to provide an automatic lawn-sprinkling system which is capable of being operated either under rain-controlled operation or otherwise by a simple switching operation.

In accordance with the objects of the invention and first briefly described my rain-controlled lawn-sprinkler system includes a timer establishing the weekly pattern of automatic lawn sprinkling in conformity with a predetermined plan. A motor operable for a predetermined interval in response to the actuation of the timer is provided. A plurality of water valves strategically located at pre-established points of the lawn for complete water coverage thereof are also provided. Further, a like plurality of water valve controlling solenoids for individual operation of the water valves are also provided. In addition a plurality of cams which are mounted for rotation on the shaft of the motor for sequential activation of individual water-valve controlling solenoids for predetermined intervals is also provided. Also, rain-control means which include a pan for accumulating rainfall and a pair of electrodes the upper one of which is positionable vertically with relation to the bottom of the rain-accumulating pan. The rain-control means are then connected in circuit with the motor to prevent actuation thereof in the event of a rainfall of a predetermined quantity. In the above manner the automatic lawn sprinkler will be prevented from actuating the water-valve control solenoids in accordance with the pre-established pattern in the event that a rain of predetermined quantity has occurred. Upon evaporation of the rain from the pan, which is also an indication of the need for watering of the lawn, the automatic lawn sprinkler will again be in condition to permit normal operation thereof in accordance with the pre-established pattern and timing. It should be appreciated that the above outlined procedure is only operative while the system is set for automatic operation and accordingly there is nothing to prevent the homeowner from switching the system from an automatic to a manually operated system. Furthermore, it should also be appreciated that in the automatic mode of operation, the sprinkling system is prevented from operating when a sufficient amount of rainfall is collected in the rain-control section, but this does not permanently disable the system but disables it only while there is sufficient moisture in the lawn. When the rain-control unit senses a decrease of rain below this pre-established value it permits automatic operation of the lawn sprinkler to resume.

The above and other objects of this invention will become apparent from the following specification taken in connection with the accompanying drawings, in which—

FIGURE 2 is a side elevational view, with parts broken away, showing the working relationship between the pan and the electrodes of the rain-control unit.

Figure 1:
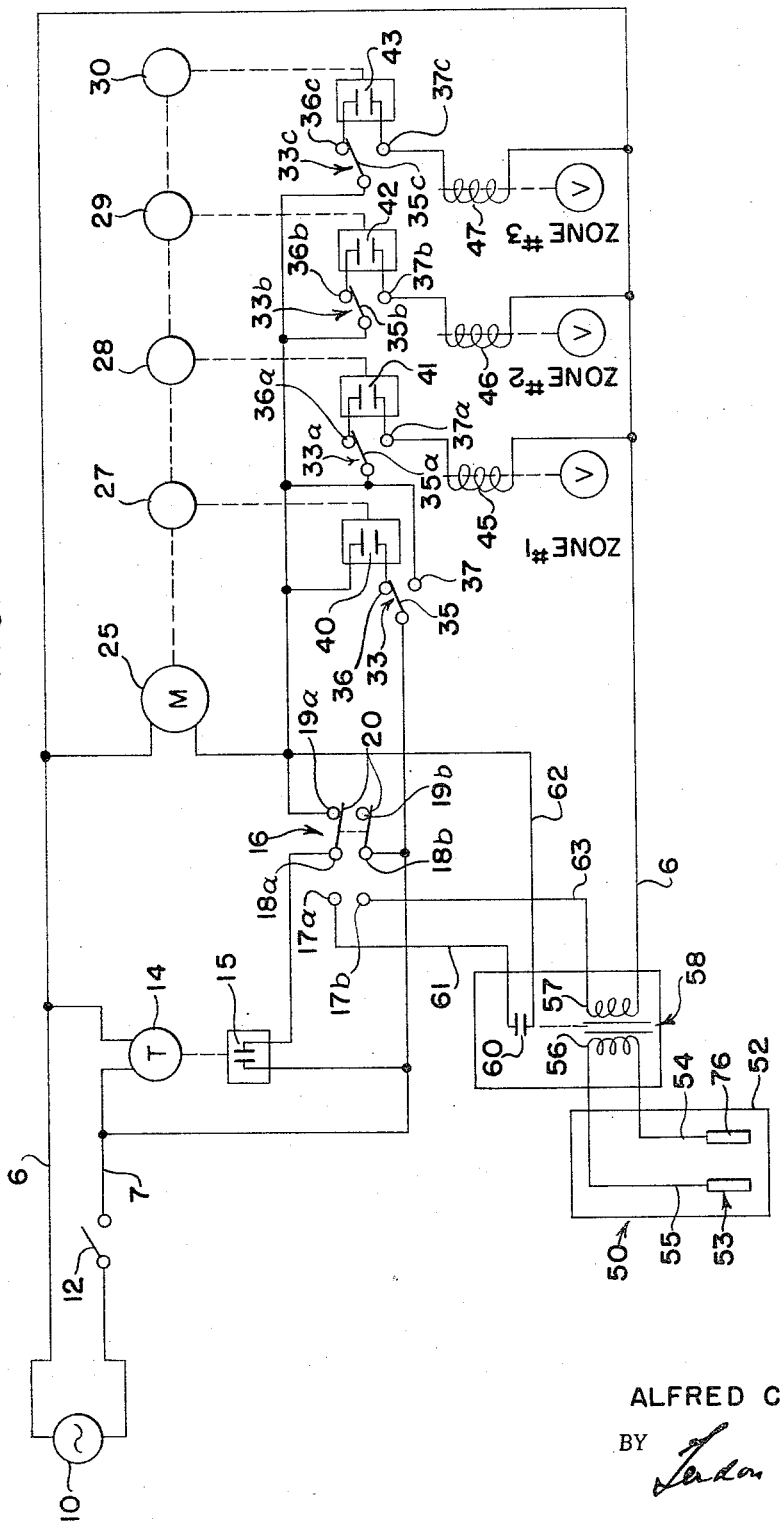
FIGURE 1 is a schematic diagram of a system incorporating the principles of my invention.

In the drawings, the sprinkling system is not shown in order to keep the drawings as simple as possible; however, it should be understood that a standard commercially available sprinkling system having a number of valve outlets will be used. The number of valve outlets will vary with the size of the lawn and with the number of zones of cam controlled solenoid valves employed. As shown in FIGURE 1, lines 6 and 7 connect the circuitry of the sprinkler system with a suitable source of electrical potential 10. As is further shown, a master switch 12 is connected in circuit between the source of potential 10 and the sprinkler system to permit manual disabling of the system. More particularly, the master switch is used to break the continuity in line 7. A pre-programmable timer is shown by reference numeral 14 and can be, in reality, any commercially available seven-day, 24-hour clock. By use of the seven-day, 24-hour timer a predetermined program which will establish the times at which the lawn sprinkling system can be enabled, during any day of the week, is possible. Accordingly, it is possible for a homeowner to program the timer to turn on at a pre-established time of the day and at pre-established days of the week. For example, in an actual working system it has been found that a desirable watering interval would be two times a week, on Tuesdays and Fridays, and it has also been found to be convenient to turn on the sprinkling system at four o'clock in the morning. This accordingly required that the seven-day, 24-hour timer be programmed to permit such an activation, or put another way, permitted the timer to be activated at the chosen times of the selected days of the week.

As is shown in FIGURE 1, the timing motor 14 is supplied with suitable power from source 10 by way of connecting leads 6 and 7. Upon activation of the seven-day, 24-hour timer, by throwing of the master switch 12, which will always be on, contacts 15, associated with motor 14, will be closed and thus permit activation of the entire lawn sprinkling system. Also, as is shown, a double-pole, double-throw switch 16 is provided. Double-pole, double-throw switch 16 is provided with neutral terminals 18a and 18b, which are shown to be connected across the contacts 15. In addition, terminals 17a and 17b indicate the terminals of the double-pole, double-throw switch, selection of which permits rain control of the automatic lawn sprinkling system. Accordingly, if the switch blades 20 of the double-pole, double-throw switch 16 are connected between neutral terminals 18 and terminals 17, operation of the system will be under the control of the rain control apparatus. On the other hand, additional terminals 19a and 19b are provided, and accordingly if the switch blades 20 are selectively positioned to connect neutral terminals 18 and terminals 19, then the automatic sprinkling system functions under control of the seven-day, 24-hour timer only and is not under the control of the moisture-or-rain-sensing mechanism. Appropriate leads connect terminals 17a and 17b to the rain-control mechanism.

In addition to the seven-day, 24-hour timer 14, a motor 25 is provided which is connected for activation between lines 6 and 7, by way of timing contacts 15 and appropriate contacts of the double-pole, double-throw switch 16. Motor 25 is of standard construction and any of the many commercially available motors which is suitable to perform the functions desired can be used. In this instance motor 25 is in fact a 6-hour timer, so that upon energization of the seven-day, 24-hour timer 14, at the appropriate time of the selected day, the closing of contacts 15 will provide a circuit path for energization of 6-hour timer 25. Upon energization, motor 25 will be in an operating condition for six hours. Thereafter the seven-day, 24-hour timer can be deenergized and it will have no effect upon the conducting state of the 6-hour timer 25.

Mounted upon the shaft of the motor 25 for rotation therewith are a plurality of cams 27 through 30. It is of course obvious that any number of cams could be mounted for rotation on the shaft of motor 25, the only criterion being the number of zones and solenoid-activated water valves which are employed in the sprinkling system. Cam 27 is provided with a camming surface that is operable to keep its associated normally open contacts 40 closed for the entire 6-hour activation period of motor 25. It is of course possible to utilize any equivalent type of circuitry or device which is operable upon activation of motor 25 to remain in a closed state for a period concurrent with that of the operating period of motor 25.

Also mounted on the shaft of motor 25 for rotation therewith is cam 28. Cam 28 is provided with an appropriate camming surface that is suitable for closing its associated normally open contacts 41 for the desired length of time and accordingly provide an electrical circuit path for its associated water-valve activating solenoid 45 by permitting current flow therethrough from line 6 through contacts 41, switch blade 33a, contact 40 associated with the full 6-hour cam 27, to the other line 7 associated with electrical power source 10. In a similar manner cams 29 and 30 are provided with appropriate camming surfaces for closing their associated normally open contacts and complete their corresponding circuit paths for activating their associated water-valve control solenoids 45, 46 and 47 at suitable intervals as determined by the sequential arrangement of the cams 28, 29 and 30 to open valves for watering zones No. 1, 2 and 3 of the lawn.

As is also shown in FIGURE 1, suitable single-pole, double-throw switching means 33, 33a, 33b and 33c associated with the contacts 40, 41, 42 and 43 are provided to permit either automatic or manual operation of the individual zones in the system. Switch blades 35 through 35c are suitably mounted for selective contact with associated terminals 36 through 36c for automatic operation of the system or 37 through 37c for manual operation of the system. In other words if the system is to be automatically operated, the individual switches 33 through 33c will be thrown for selectively contacting the terminals 36 through 36c respectively, but if manual operation of selected zone valves is preferred, then selected ones of switch blades 35 through 35c may be thrown to their respective 37 through 37c terminals, and manual operation of the desired water valves can then be carried out. It is also clear from the circuit diagram of FIGURE 1 that it is, of course, possible to permit switch 33 associated with the full 6-hour cam 27 to remain on an automatic setting, terminal 36, and to switch the other switches 33a, 33b and 33c to their manual terminals 37a through 37c respectively, and accordingly permit the manual operation of the appropriate zone water valves only during the time that the motor 25 is activated. Furthermore, various other combinations or arrangements can be selected by appropriate settings of the switches 33 through 33c.

For the time being let us assume that the rain-control portion of the circuitry which includes the probe 53 in the pan 52 (FIGURE 2) is not available and that the system will operate on an automatic or manual basis. In this instance master switch 12 will be in a circuit closing position, double-pole, double-throw switch 16 will have its switch blades 20 selectively positioned to make terminals 19. Furthermore, let us also assume that the appropriate mode selecting control switches 33 through 33c are positioned for selective contact with terminals 36 through 36c, respectively, for automatic operation of the zones in accordance with the sequential setting of the appropriate cams 28 through 30. In this arrangement it is seen that the seven-day, 24-hour timer 14 will be appropriately connected across lines 6 and 7 for activation by the suitable electrical source 10. Upon activation of the seven-day, 24-hour timer 14, in accordance with the desired time and day arrangements programmed therein its associated timing contact 15 will close for a suitable length of time to permit activation of motor 25. Motor 25 will have a complete electrical activation path across lines 6 and 7 by way of terminals 19a and 19b of the double-pole, double-throw switch 16, switch blades 20, neutral terminals 18, and the contacts 15 associated with timer 14, to the other line 7.

Upon activation of the 6-hour motor 25, rotation of the shaft associated therewith will result in the closing of timing contact 40 by rotation of its associated cam 27. As was explained above, cam 27 has an appropriate camming surface which will keep its associated timing contact 40 in a closed position for the entire running time of the 6-hour timing motor 25. Upon the closing of the timing contacts 40 associated with the 6-hour cam 27 a parallel latching circuit is enabled which provides a suitable motor-completing circuitry for motor 25. More specifically, upon the closing of contacts 40 motor 25 will have a current path comprising line 6, motor 25, timing contacts 40, terminal 36, switch blade 35 of the selectively positionable single-pole, double-throw switch 33 and line 7 to make contact by way of master switch 12 to the electrical supply source 10. In this manner it is seen that once motor 25 has been activated by the seven-day, 24-hour timer 14, and its associated timing contacts 15, the seven-day, 24-hour timer can be deactivated and motor 25 will continue to be supplied with power by way of the appropriate latching circuitry just described.

Furthermore, depending upon the camming surfaces available on the sequential operable cams 28 through 30, respectively, a selective closing of the timing contacts associated therewith will result in a sequential selective operation of the plurality of strategically located water valves. More specifically, let us assume that we desire zone No. 1 to be permitted to water its particular lawn area for one hour. Cam 28 would be provided with a camming surface which assures an operative contact-closing position immediately upon the energization of the 6-hour timer motor 25. In this manner a suitable camming surface will be provided upon cam 28 to close its associated timing contacts 41 for the desired length of time. In this case since the motor 25 will run for 6 hours, and since we are assuming that we have three timing cams for concurrent rotation upon the shaft thereof each of the cams is provided with a suitable camming surface for two-hour closure of its associated contacts, and a sequential arrangement of activation for cams 28, 29 and 30 is accomplished. It is possible to provide each of the cams 28 through 30 with a plurality of camming surfaces and accordingly provide a sequence of 15-minute contact-closing intervals for the cams 28, 29 and 30 over the entire 6-hour watering period. Any desired timing can be programmed in this manner.

In the instant embodiment we have shown one-half hour cams timed to operate in sequence so that upon the energization of motor 25 cam 28 will remain in the activated state for one-half hour whereupon it will be deactivated and cam 29 will be immediately operable to close its associated contacts 42 for one-half hour. Likewise upon contacts 42 assuming their normally open position, the operative cam surface of cam 30 will result in the closing of its associated timing contacts 43 to provide an electrical energization path for current through its associated valve operating solenoid 47.

The moisture-control or rain-accumulating-and-control circuitry comprises a rain-accumulating section 50 (FIGURE 1). As shown in some detail in FIGURE 2, this includes a pan 52 for collecting rain. The bottom of the pan and the sides up to overflows 70 are impervious so that water is removed from the pan only by evaporation. The probe or electrode 53 is insulated (by insulation which is not shown) from the probe holder 77 which is grounded through wire 54 located with the probe wire 55 within the flexible tubing 79. The housing 76 which serves as the other electrode and is also grounded, is threaded onto the holder 77, so that the difference between the bottoms of the probe and housing can be varied and fixed by lock nut 78 to determine the height of water required in the tank to close the circuit between the probe and the holder. When rain water collects in the tank 52 to a depth sufficient to cover the end of the probe it is shorted. In other words, with the arrangement as shown, as long as the probe is dry, the rain-control circuitry is functional to permit operation of the automatic sprinkling system, assuming that the double-pole, double-throw switch 16 is making selective contact with terminals 17, to activate the seven-day, 24-hour timer 14. However, in the event that the depth of the water in pan 52 is sufficient to provide a conducting path between the probe and the housing so as to short out the associated secondary winding 56 (FIGURE 1), which is shown to be connected between the wires 54 and 55, then, assuming the double-pole, double-throw switch 16 to be in the rain-controlled position, operation of the sprinkling system is prevented until the water collected in pan 52 evaporates to the point of removing the aqueous circuit path between the probe and its housing.

As is further shown in FIGURE 1, one side of the primary transformer 58 is shown to be connected by way of lead 6 to one side of the electrical power source 10. The other side of primary 57 is connected to terminal 17b of the rain-control terminals associated with double-pole, double-throw switch 16. Transformer 58 is provided with an iron core in the usual and customary manner of transformer construction. As further shown, a normally closed contact 60 associated with the transformer and positioned in operational relationship with the iron core of the transformer 58, has one end connected to terminal 17a of the double-pole, double-throw switch 16. The other terminal of contacts 60 is connected by way of lead 62 to the motor 25.

In the above manner, and assuming that the double-pole, double-throw switch 16 is thrown to make selective contact with contacts 17, to accordingly place the automatic sprinkling system under the control of the associated rain-measuring circuitry we now proceed to explain the operation of the system with such connections. In the event that pan 52 has accumulated a sufficient amount of water, the sufficiency depending upon elevational position of the probe 53 relative to the bottom of pan 52, we find that the current conducting path provided by the water will result in the shorting out of the secondary 56 of transformer 58. Upon the shorting of secondary 56, transformer 58 will act as a solenoid and accordingly any energization current which flows through the primary 57, the primary winding 57, thereof, by way of lead 6, lead 63, terminal 17b, switch blade 20, and lead 7 will result in the magnetization of the iron core associated with the transformer to open contacts 60. The opening of contacts 60 will result in the prevention of a complete circuit for motor 25, even though the seven-day, 24-hour timer 14 has been activated in accordance with the pre-established program therein to close contacts 15. Assuming that switch 16 has the blades 20 selectively making contact with terminals 17, the motor 25 circuit path which includes lead 62, open contacts 60, lead 61, terminal 17a, switch blade 20, and contacts 15 back to the other lead 7 will be open. Accordingly, it is seen that with an adequate rainfall having occurred the automatic sprinkling system will be disabled and inoperable to activate their associated valve controlling solenoids.

On the other hand, upon the appropriate time as established by the seven-day, 24-hour timer 14 occurring, and assuming that pan 52 has not collected a sufficient amount of water therein to result in a current path between electrodes 53 and 76 being established, the secondary 56 of transformer 58 will not be shorted out. In this event the 110 volts placed across primary 57 of transformer 58 will result in approximately 380 volts being generated at the secondary winding 56. The result of this is that transformer 58 will operate in a normal manner and the normally closed contacts 60 will not open. Thereafter, upon the activation of the seven-day, 24-hour timer 14, and the closing of its associated contacts 15 a complete current path will be provided to motor 25, by way of the normally closed contacts 60 to result in the appropriate sequential operation of cams 27 through 30. Upon the activation of the 6-hour timer, motor 25 and the resulting closing of contacts 40 by the associated full 6-hour cam 27, a latching or timing contact 15 bypass path is completed to prevent deenergization of the 6-hour motor 25 upon deactivation of the seven-day, 24-hour timer 14. In other words, even though the seven-day, 24-hour timer 14 is only activated for a short period of time, approximately 15 minutes, and accordingly its associated contacts 15 are also only closed for approximately 15 minutes, this would not result in the opening up of the circuit path for operating voltage across motor 25 because by this time a suitable parallel latching path for providing appropriate voltage across motor 25 is available by way of contacts 40 and the selectively positionable switch 35. However, getting back to the operation of the rain-control circuitry associated with the automatic sprinkling system, we find that upon the activation of the seven-day, 24-hour timer 14, and in the event that a suitable quantity of rainfall has not fallen to short out the probe, contacts 60 will remain closed to enable a complete circuit path therethrough for motor 25. The activation of motor 25 will then result in the sequential operation of the shaft mounted cams 27 through 30 in a manner as explained in greater detail hereinbefore.

It is, of course, possible to substitute a float controlled switch arrangement (not shown) to control the operation of the automatic lawn sprinkler. More specifically, a pan similar to the one shown by numeral 52 would be provided and a commercially available float will be operatively mounted thereon for elevational movement by the collected rain water. Operatively mounted on the float for activation will be a switchable mercury switch, which is represented by the numeral 60 in FIGURE 1. Similar to the arrangement heretofore described mercury switch 60 will be in a normally closed position to permit operation of the sprinkler system but upon a collection of a predetermined quantity of rain water in pan 52 the float will be moved to result in an opening of switch 60 and thereby prevent operation of the sprinkler.

Looking now to FIGURE 2 we see in more detail the actual rain-accumulating, rain-control hardware which includes a pan 52 and a probe 53. The pan 52 may be made of fiberglass construction, or any suitable non-conducting material may be used. Furthermore, the pan may be mounted on the roof of the home or any other suitable rain-exposed location open to the sun will be adequate. While it should be emphasized that any dimensions which are adequate for the purposes and reasons involved may be used, in this case I have constructed my pan with a 12-inch diameter and a one and one-half inch deep annular sidewall. Positioned along the upper periphery of the annular sidewall of pan 52, are six equally spaced apertures 70 to prevent the accumulation of the water to a height greater than the equivalent of the amount that is retained in the ground after a rainfall. A screen 71 is provided to prevent leaves and any other undesirable foliage from entering the pan. Six threaded apertures 72 equally spaced between the overflow notches 70, around the annular sidewall, are provided for fully attaching screen 71 to pan 52.

Positioned centrally within the pan 52 is a probe holder casting 73. This is threaded to receive a conduit which may serve as a ground, making the ground wire 54 unnecessary. Extending through casting 73 is tube 79 which contains the appropriate wiring for connecting probe 53 and holder 77 to the ends of secondary winding 56 of transformer 58. The concentric probe holder 77 is used for intercoupling the probe 53 with the flexible tubing 79. A web 75 (FIGURE 2) connects the probe holder casting with the housing 76 and provides a suitable sturdy construction. The probe holder casting 73 is fixed in a centrally upright position relative to pan 52 by means of bolts 74. In addition an appropriate sealing gasket 80 may be positioned between the base of the probe holder casting 73 and the inner surface of the pan 52 to prevent a loss of water therethrough.

Different probe arrangements may readily be substituted for that shown, adapted to be grounded through the collected water with the tank or an electrode placed in the tank, if the tank is of non-conductive construction.

While it will be apparent that the embodiment of the invention herein disclosed is well calculated to fulfill the objects of the invention, it should be appreciated that the invention is susceptible to modification, variation and change without departing from the proper scope or fair meaning of the subjoined claims.

What I claim is:

1. A rain-controlled automatic lawn-sprinkler system comprising a timer establishing a periodic sprinkler-system initiation pattern, a motor operable for a predetermined interval in response to activation of said timer, a timer by-passing circuit including a cam-operated pair of contacts closable in response to activation of said motor, a water valve, a solenoid controlling the activation of said water valve, a pair of normally opened contacts connected in circuit with said solenoid, a cam mounted for rotation in the shaft of said motor to close said contacts at preselected times, circuit means operable to connect said solenoid in circuit with said timer by-passing circuit, a rain-accumulating pan which is open to the sun and has an impervious bottom and walls the bottoms of which are impervious whereby removal of accumulated water from said impervious portion is by evaporation only, two vertically separated electrodes within the pan adapted to be shorted by rainfall collected therein, a transformer having primary and secondary windings wound upon an iron core, the primary winding thereof connecting to a suitable supply of electrical potential and the secondary thereof having individual ends connected to individual ones of said electrodes, and a normally closed pair of contacts electromagnetically associated with the iron core of said transformer, said contacts being in circuit with said motor and said contacts associated with said timer to permit activation of said motor upon energization of said timer in the absence of sufficient rainfall to complete an electrical path between said pair of electrodes, and operable to prevent activation of said motor in the event that sufficient rainfall has failed to provide a circuit path between said electrodes.

2. A rain-controlled automatic lawn-sprinkler system comprising a timer establishing a periodic sprinkler-system initiation pattern, a motor operable for a predetermined interval in response to activation by said timer, a timer by-passing circuit including a cam-operated pair of contacts closable in response to actuation of said motor, a plurality of water valves strategically positioned on the lawn for proper lawn watering, a plurality of solenoids for individual control of individual ones of said plurality of water valves, a plurality of normally opened contacts individual ones of which are connected in circuit with individual ones of said plurality of solenoids, circuit means operable to connect each of said plurality of solenoids in circuit with said timer by-passing circuitry, a rain-accumulating pan which is open to the sun and has an impervious bottom and walls the bottoms of which are impervious whereby removal of accumulated water from said impervious portion is by evaporation only, two electrodes one of which is positionable vertically in said rain-accumulating pan in accordance with the desired amount of rainfall necessary for completion of an electrical path therebetween, a transformer including a primary and secondary winding wound about an iron core, the primary thereof connected to a suitable source of electrical potential and the secondary operatively connected to said electrodes, a normally closed pair of contacts electromagnetically associated with the iron core of said transformer, said contacts being in circuit with said motor and with said timer to permit activation of said motor upon energization of said timer in the absence of sufficient rainfall to complete an electrical path between said pair of electrodes, and operable to prevent actuation of said motor in the event that sufficient rain has been accumulated in said pan to provide an electrical circuit path between said electrodes to thereby short out the secondary winding of said transformer.

3. A rain-controlled automatic lawn-sprinkler system comprising a timer establishing a periodic sprinkler-system initiation pattern, a motor operable for a predetermined interval in response to activation by said timer, a normally open timer by-passing circuit closable in response to actuation of said motor, a plurality of water valves strategically positioned on the lawn for suitable lawn watering, a plurality of solenoids for individual control of individual ones of said plurality of water valves, a plurality of normally opened contacts individual ones of which are connected in circuit with individual ones of said plurality of solenoids, circuit means operable to sequentially connect each of said plurality of solenoids in circuit with said timer by-passing circuitry, a rain-accumulating pan which is open to the sun and has an impervious bottom and walls the bottoms of which are impervious whereby removal of accumulated water from said impervious portion is by evaporation only, two electrodes one of which is positionable vertically in said rain-accumlating pan in accordance with the desired amount of rainfall necessary for completion of an electrical path therebetween, a transformer including a primary and secondary winding wound about an iron core, the primary thereof connected to a suitable source of electrical potential, said electrodes being effectually connected to short out said secondary upon an electrical circuit path being established between said electrodes, a normally closed pair of contacts electromagnetically associated with the iron core of said transformer, said contacts being in circuit with said motor and with said timer to permit activation of said motor upon energization of said timer in the absence of sufficient rainfall to complete an electrical path between said pair of electrodes, and operable to prevent actuation of said motor in the event that sufficient rain has been accumulated in said pan to provide an electrical circuit path between said electrodes to thereby short out the secondary winding of said transformer.

4. An automatic sprinkling system comprising motor-actuated sprinkler means, a programmable timer capable of generating a motor initiating signal at predetermined periodic intervals, and rain-accumulating control means including a pan for accumulating rainwater which is open to the sun and has an impervious bottom and walls the bottoms of which are impervious whereby removal of accumulated water from said impervious portion is by evaporation only, and a pair of vertically spaced electrodes the upper one of which is positionable vertically within said pan, a transformer having a primary and secondary winding wound about an iron core, opposite ends of said secondary winding operatively connected to said electrodes, and a pair of relay contacts in circuit between said timer and said motor, said contacts being normally closed to permit actuation of said motor by said timer in accordance with the periodic program stored therein in the event that said pan has not collected a sufficient quantity of rainwater to result in an electrical circuit path between said electrodes at the time of generation of a motor actuation signal by said timer, and being operable to open and prevent actuation of said motor by said timer in response to a shorting out of said secondary winding upon a circuit path being established between said electrodes by the collected rainwater.

5. An automatic sprinkling system comprising motor actuated sprinkler means, a programmable timer capable of generating a motor initiating signal at predetermined periodic intervals, and rain-accumulating control means including a pan for accumulating rainwater which is open to the sun and has an impervious bottom and walls the bottoms of which are impervious whereby removal of accumulated water from said impervious portion is by evaporation only, and a pair of vertically spaced electrodes the upper one of which is positionable vertically within said pan, a transformer having a primary and secondary winding wound about an iron core, opposite ends of said secondary winding operatively connected to said electrodes, and a pair of relay contacts in circuit between said timer and said motor, said relay contacts being in electromagnetic relationship to said transformer and being normally closed to permit actuation of said motor by said timer in accordance with the periodic program stored therein in the event that said pan has not collected a sufficient quantity of rainwater to result in an electrical circuit path between said electrodes at the time of generation of a motor actuation signal by said timer, and being operable to open in response to the electromagnetic force established by the shorting out of said secondary winding due to a circuit path being established between said electrodes by the collected rainwater, to result in the shorting out of said secondary winding and accordingly prevent actuation of said motor by said timer.

References Cited by the Examiner
UNITED STATES PATENTS

| | | | |
|---|---|---|---|
| 2,674,490 | 4/1954 | Richards | 239—64 |
| 2,737,615 | 3/1956 | Roby et al. | 239—64 |
| 2,776,860 | 1/1957 | Griffis | 239—65 |
| 2,991,938 | 7/1961 | Norcross | 239—65 |
| 3,140,720 | 7/1964 | Griswold | 137—78 |
| 3,195,816 | 7/1965 | Mercer | 239—63 |

EVERETT W. KIRBY, *Primary Examiner.*